F. M. MECHLING.
BEAM HANGER.
APPLICATION FILED OCT. 11, 1921.

1,426,834.

Patented Aug. 22, 1922.
2 SHEETS—SHEET 1.

Inventor,
F. M. Mechling.

F. M. MECHLING.
BEAM HANGER.
APPLICATION FILED OCT. 11, 1921.

1,426,834.

Patented Aug. 22, 1922.
2 SHEETS—SHEET 2.

F. M. Mechling,
Inventor.

By [signature],
Attorneys

UNITED STATES PATENT OFFICE.

FIDELIS M. MECHLING, OF WICHITA, KANSAS.

BEAM HANGER.

1,426,834.

Specification of Letters Patent. Patented Aug. 22, 1922.

Application filed October 11, 1921. Serial No. 507,140.

*To all whom it may concern:*

Be it known that I, FIDELIS M. MECHLING, a citizen of the United States, residing at Wichita, in the county of Sedgwick and State of Kansas, have invented a new and useful Beam Hanger, of which the following is a specification.

The device forming the subject matter of this application is adapted to be used for suspending sucker rods and other elements from the beam of a drilling rig of the kind used in connection with well sinking and pumping.

The invention aims to provide novel means for suspending a clamp from a beam, and to improve the construction of the clamp.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings :—

Figures 1, 2:
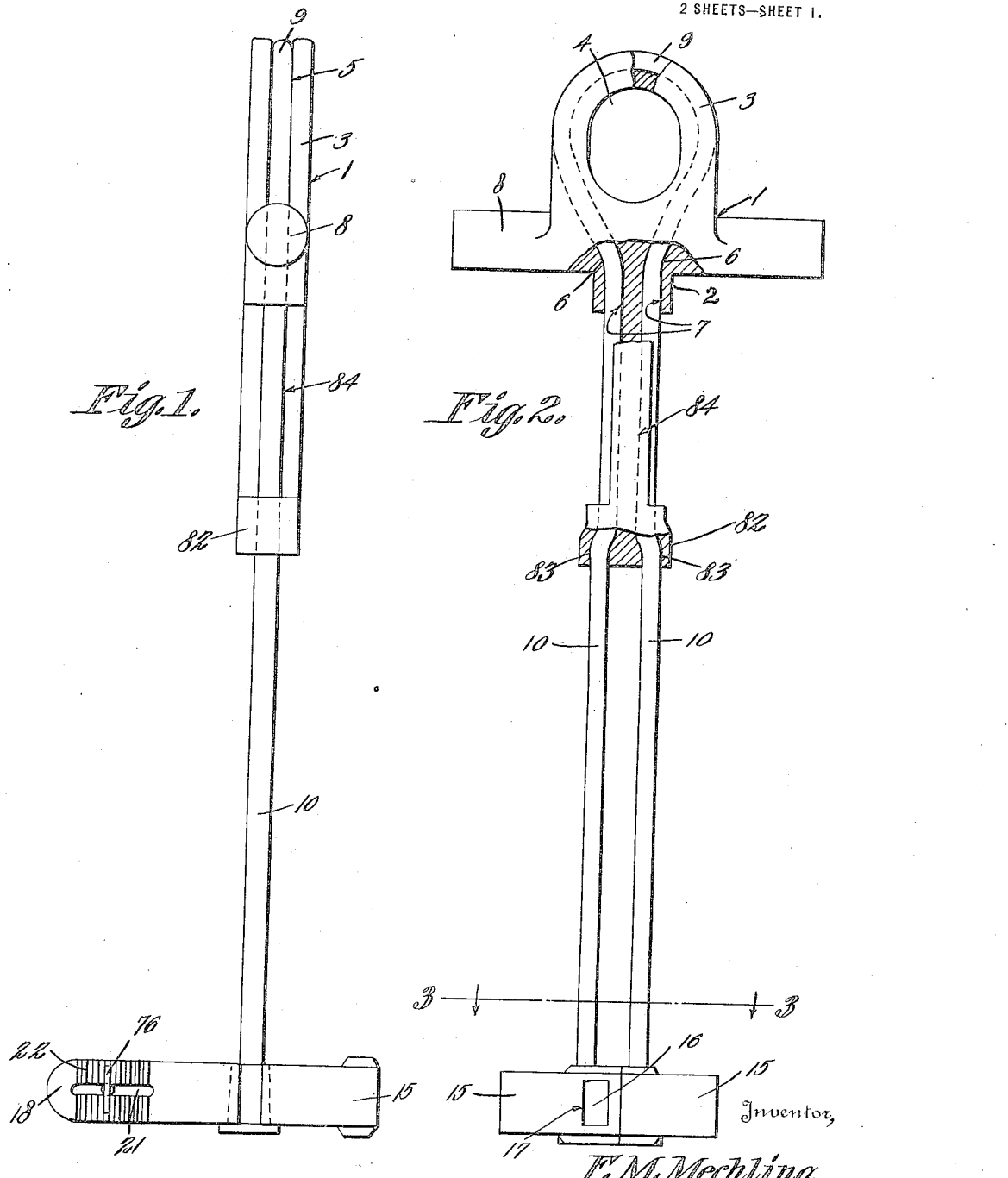
Figure 3:
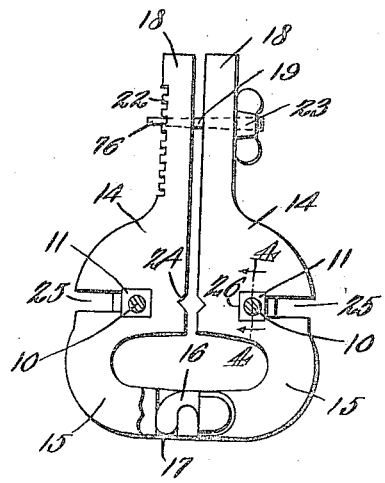
Figure 4:
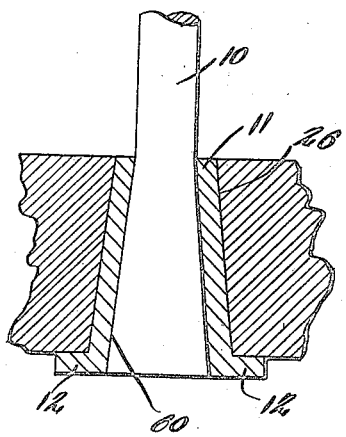
Figure 5:
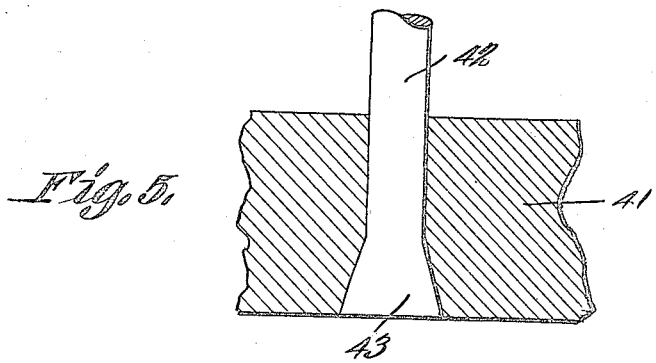

Figure 1 shows in side elevation, a device constructed in accordance with the invention; Figure 2 is an elevation wherein the structure is shown at right angles to the disclosure of Figure 1, parts appearing in section; Figure 3 is a cross section on the line 3—3 of Figure 2; Figure 4 is a cross section on the line 4—4 of Figure 3; Figure 5 is a sectional detail illustrating a slight modification in the invention.

Referring to the drawings, there is shown a suspension member 1 comprising a depending body 2 provided at its upper end with an enlarged head 3 having an opening 4, facilitating the handling of the suspension member. The body 2 of the suspension member terminates in a broadened foot 82. The head 3 has an external marginal groove 5, communicating with bores 6 formed in the head 3, the bores 6 converging as they extend downwardly, and communicating with parallel bores 7 in the upper portion of the body 2. In the foot 82, there are bores 83 which are spaced apart more widely than are the bores 7. The body 2 is cut away at its sides, to form open grooves 84, connecting the bores 7 and 83. The suspension member 1 is provided, at the point where the head 3 joins the body 2, with laterally extended trunnions 8, adapted to be used in mounting the suspension member 1 on a beam, in a manner common to those skilled in the art. A flexible element, such as a cable, is provided, the cable being formed into a loop 9 seated in the groove 5 of the head 3, the arms 10 of the flexible element being extended through the bores 6 and 7, along the grooves 84, and through the bores 83. The arms 10 are carried downwardly to a point considerably below the foot 82 of the body 2. Since the body is cut away at its opposite sides, to form the grooves 84, the arms 10 of the flexible element 9 are exposed throughout a portion of their length, and the insertion of the flexible element into the suspension member is facilitated accordingly. Further, since the bores 83 are spaced apart at considerable distance, the lower portions of the arms 10 of the flexible element are spaced apart accordingly and are not likely to become twisted together. In view of the fact that the bend of the flexible element 9 is seated in the groove 5, wearing and chafing of the flexible element is avoided, and, in operation, all of the strain is carried into the trunnions 8, so much of the suspension member 1 as lies below the trunnions 8, serving as a support or housing for maintaining the depending portions of the flexible element in place. Frusto-pyramidal anchors 11 are provided, the lower ends of the arms 10 of the flexible element being enlarged as indicated at 60 in Figure 4, and being secured in the anchors, the anchors having outstanding lateral flanges 12 at their lower ends.

A clamp is provided, and may be of any desired form. As shown in Figure 3, the clamp is made up of jaws 14 having inwardly prolonged extensions 15, one extension being supplied with a curved lug 16 received in an opening 17 in the other extension, a pivotal connection between the jaws 14 thus being afforded. The jaws 14 have reduced ends 18 provided with longitudinal slots 21. On each side of the slot 21, one part 18 is provided, on its outer surface, with teeth 22. The numeral 19 marks a tightening device, such as a bolt, the bolt being supplied at one end with an elongated head 76, the head being of such length that it can be inserted through the slot 21. If, however, the head 76 is disposed transversely of the slot 21, the ends of the head 76 are engaged with the teeth 22. The tightening device 19, being located in the slots 21, may be shifted longitudinally of the parts 18 of the jaws, thereby to regulate the effectiveness of the tightening device. A nut 23 is threaded on the bolt 19 and engages that part 18 of the clamp which has no teeth 22.

In their inner edges, the jaws 14 are equipped with cooperating grooves 24, adapted for the reception of a sucker rod or like object which is to be held by the clamp. In the outer edges of the jaws 14, notches 25 are fashioned, the notches being enlarged at their inner ends to form seats 26. The arms 10 of the flexible element 9 are passed inwardly through the notches 25, and if the clamp then be carried downwardly, the anchors 11 will be received in the seats 26, as shown in Figure 4, the flanges 12 on the anchors ordinarily bearing against the lower surface of the jaws 14, the seats being shaped to receive the frusto-pyramidal anchors.

By tightening the nut 23, the jaws 14 may be caused to grip a sucker rod or like object tightly. The jaws, however, may be separated readily upon occasion, and especial attention is directed to the simple but efficient means whereby the arms 10 of the flexible element are engaged detachably with the jaws 14 of the clamp.

If desired, as shown in Figure 5, the ends 42 of the cable may be enlarged as at 43, and engaged directly with the parts 41 of the clamp, the anchors 11 being omitted.

Having thus described the invention, what is claimed is:—

1. In a device of the class described, a suspension member including a body having trunnions, and provided with a head, the head having a groove, and there being bores in the body; a flexible element located in the groove and having arms which are extended through the bores; and a clamp mounted on the arms.

2. In a device of the class described, a pair of jaws provided with notches terminating in enlarged seats; means for producing relative movement between the jaws; flexible elements having anchors, the flexible elements being insertable into the jaws by way of the notches, and the anchors being received in the seats.

3. In a device of the class described, a clamping member having an opening; an anchor fitting in the opening and provided at one end with a flange engaging the clamping member; and a flexible element secured in the anchor.

4. In a device of the class described, a suspension member including a head, a body, and trunnions projecting laterally from the suspension member at the place of juncture between the head and the body, the head having a groove, and the body having upper and lower bores, the upper bores communicating with the groove, the body being cut away between the upper and lower bores to form open grooves connecting the said bores, and facilitating the insertion of a flexible element into the suspension member, the groove in the head being adapted for the reception of a flexible element, to prevent the wearing thereof.

In testimony that I claim the foregoing as my own, I have hereto affixed my signature in the presence of two witnesses.

FIDELIS M. MECHLING.

Witnesses:
S. G. BOND,
B. P. DAVIDSON.